US008405936B2

(12) United States Patent
Ehlers et al.

(10) Patent No.: US 8,405,936 B2
(45) Date of Patent: Mar. 26, 2013

(54) POWER DIVERTER HAVING A MEMS SWITCH AND A MEMS PROTECTION SWITCH

(75) Inventors: Eric R. Ehlers, Santa Rosa, CA (US); Dean B. Nicholson, Windsor, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1333 days.

(21) Appl. No.: 12/114,696

(22) Filed: May 2, 2008

(65) Prior Publication Data

US 2009/0272634 A1 Nov. 5, 2009

(51) Int. Cl.
*H02H 3/02* (2006.01)

(52) U.S. Cl. .......................................................... 361/1

(58) Field of Classification Search ...................... 361/1
See application file for complete search history.

(56) References Cited

U.S. PATENT DOCUMENTS

| | | | | |
|---|---|---|---|---|
| 6,600,294 | B1 * | 7/2003 | DiPiazza | 323/212 |
| 6,884,950 | B1 | 4/2005 | Nicholson et al. | |
| 6,982,903 | B2 * | 1/2006 | Bertin et al. | 365/163 |
| 7,385,445 | B2 * | 6/2008 | Wright | 330/51 |
| 7,495,952 | B2 * | 2/2009 | Lal et al. | 365/164 |
| 7,737,810 | B2 * | 6/2010 | Chan et al. | 335/78 |
| 2004/0113713 | A1 * | 6/2004 | Zipper et al. | 333/103 |
| 2006/0125602 | A1 * | 6/2006 | Posamentier et al. | 340/10.3 |

* cited by examiner

*Primary Examiner* — Rexford Barnie
*Assistant Examiner* — Ann Hoang

(57) ABSTRACT

A power diverter has a first terminal for interposition between a signal input and a signal output. A MEMS switch is coupled to the first terminal and has a MEMS switch control input. A MEMS protection switch is coupled to the MEMS switch and has a protection switch control input. The switch control inputs are configured to receive control signals for selectively placing the power diverter in i) an ON state in which signal power at the signal input is diverted from the signal output via the MEMS switch and the MEMS protection switch, ii) an OFF state in which signal power at the signal input is not diverted from the signal output, and in which the MEMS switch mitigates an insertion loss and distortion imparted by the MEMS protection switch to a signal path between the signal input and the signal output, and iii) an intermediary state in which the MEMS protection switch reduces current flow through the MEMS switch.

16 Claims, 8 Drawing Sheets

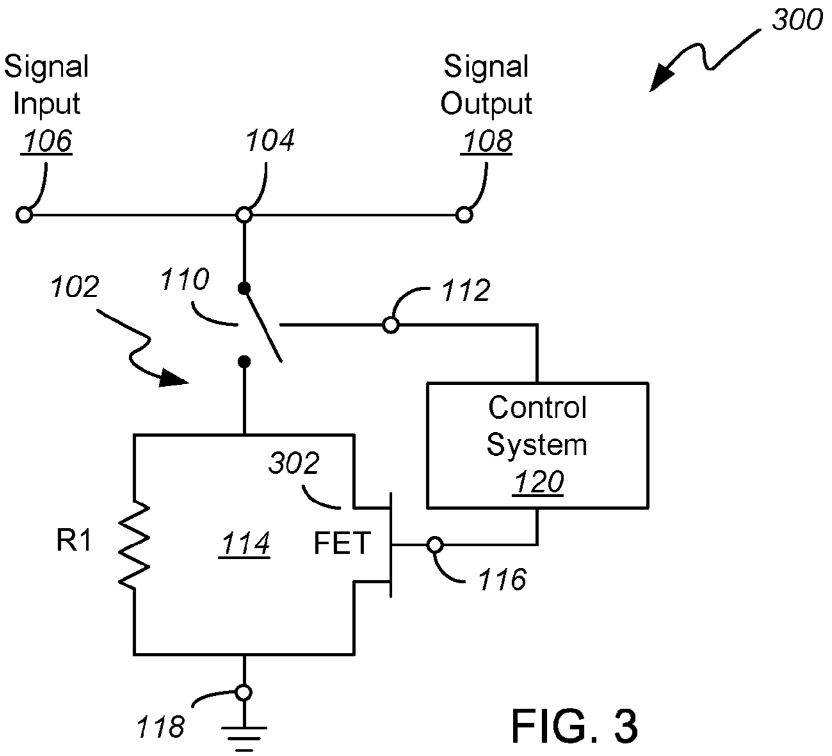
FIG. 3
FIG. 4
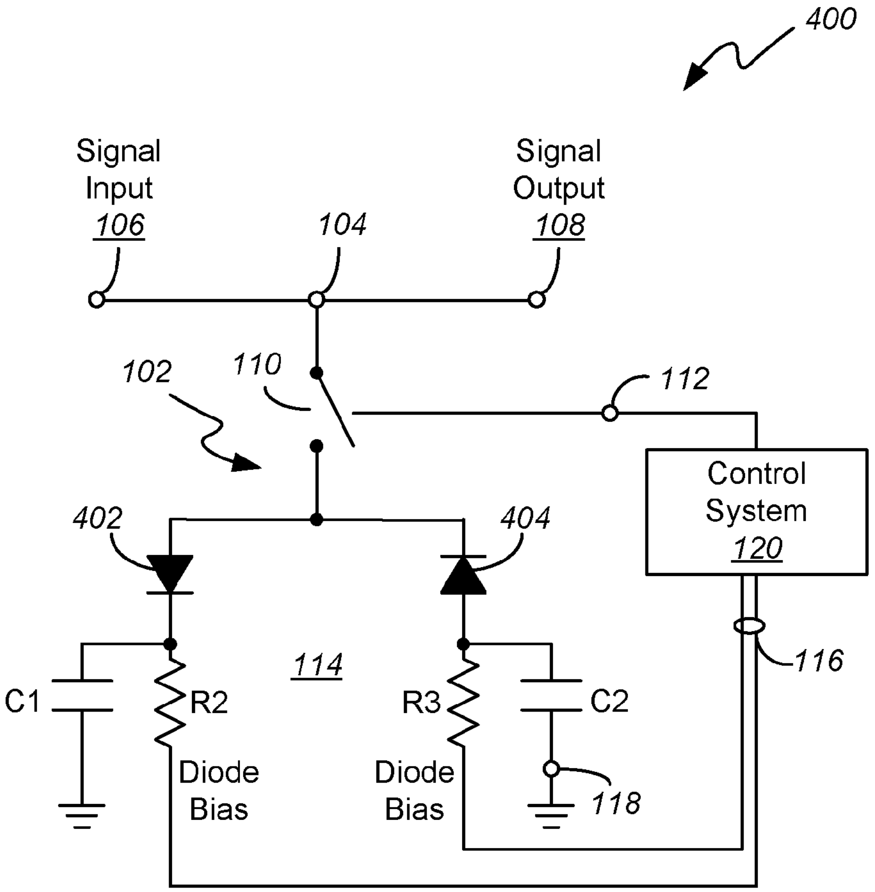

POWER DIVERTER HAVING A MEMS SWITCH AND A MEMS PROTECTION SWITCH

BACKGROUND

Micro-Electro-Mechanical Systems (MEMS) components are made of integrated mechanical and electrical elements, microfabricated on a common semiconductor or dielectric substrate. MEMS switches have many properties that make them ideal for switching broadband electrical signals. For example, they typically have very broad bandwidth due to their high $\frac{1}{2}\pi(R_{on}C_{off})$, which translates into lower insertion loss in the ON state and higher isolation in the OFF state. MEMS switches are also physically small, and they have reasonably fast switching speeds. They also tend to have very low distortion, typically much less than semiconductor switches.

One problem with MEMS switches is that their reliability is greatly reduced if they are switched in the presence of a high power signal. This is called "hot switching". Typically MEMS switches must switch at lower than about 10 dBm of power if they are to maintain their reliability. One solution to this problem is to use a power diverter to divert power from a MEMS switch before it is switched. A power diverter is also a switch, but one that can reliably switch in the presence of a high power signal.

A power diverter is placed electrically upstream from a MEMS switch. When the power diverter is in its ON state, some or all of the signal power supplied to the MEMS switch is diverted from the MEMS switch, thereby allowing the MEMS switch to be switched in a lower power (or no power) state in which the reliability of the MEMS switch can be maintained. When the power diverter is in its OFF state, it ideally passes signals to the MEMS switch with no distortion, or with distortion comparable to the distortion in the MEMS switch. However, the distortion in most semiconductor-based power diverters makes this difficult to achieve.

By way of example, some exemplary semiconductor-based power diverters are disclosed in U.S. Pat. No. 6,884,950 B1 of Nicholson et al.

BRIEF DESCRIPTION OF THE DRAWINGS

Illustrative embodiments of the invention are illustrated in the drawings, in which:

FIG. 3 illustrates a FET implementation of the MEMS protection switch shown in FIG. 1;

FIG. 4 illustrates a diode implementation of the MEMS protection switch shown in FIG. 1;

DETAILED DESCRIPTION

Figure 1:
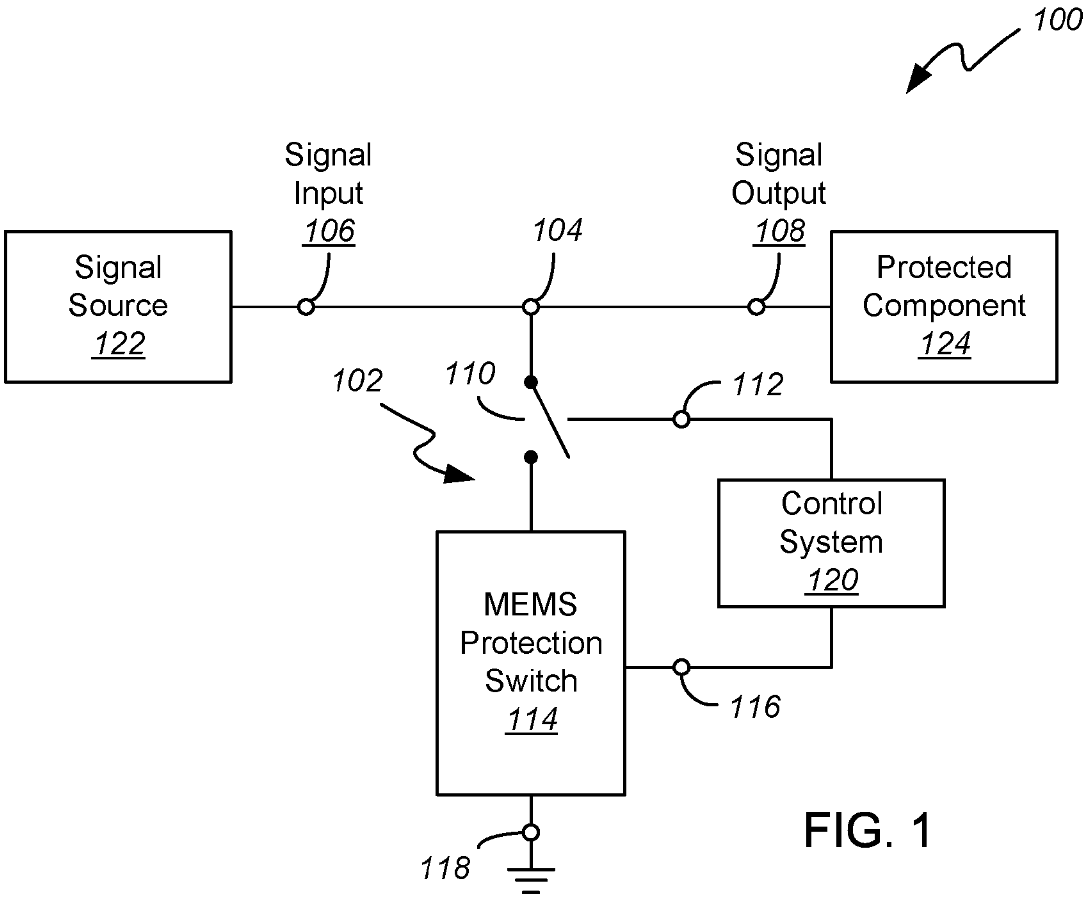
FIG. 1 illustrates a first exemplary apparatus comprising a first exemplary power diverter (a shunt power diverter)

FIG. 1 illustrates a first exemplary apparatus 100. The apparatus 100 comprises a first exemplary power diverter 102 having a first terminal 104 for interposition between a signal input 106 and a signal output 108. A MEMS switch 110 is coupled to the first terminal 104 and has a MEMS switch control input 112. A MEMS protection switch 114 is coupled to the MEMS switch 110 and has a protection switch control input 116. The MEMS switch control input 112 and the protection switch control input 116 are configured to receive control signals for selectively placing the power diverter 102 in an ON state, an OFF state, and an intermediary state.

In the ON state of the power diverter 102, signal power at the signal input 106 is diverted from the signal output 108. The signal power is diverted via the MEMS switch 110 and the MEMS protection switch 114. In the OFF state, signal power at the signal input 106 is not diverted from the signal output 108, and the MEMS switch 110 mitigates an insertion loss and distortion that is imparted by the MEMS protection switch 114 to a signal path between the signal input 106 and the signal output 108. In the intermediary state, the MEMS protection switch 114 reduces current flow through the MEMS switch 110. As will become clear later in this description, the power diverter 102 can be cycled through the intermediary state prior to switching the state of the MEMS switch 110. In this manner, the MEMS switch 110 can be switched under safe conditions, thereby preserving the life of the MEMS switch 110, and consequently, the life of the power diverter 102.

By way of example, the power diverter 102 is configured as a shunt power diverter, wherein the MEMS switch 110 and the MEMS protection switch 114 are coupled in series between the first terminal 104 and a ground terminal 118, in shunt with the signal path between the signal input 106 and the signal output 108.

A control system 120 may be used to send the control signals to the MEMS switch control input 112 and the protection switch control input 116. During the OFF state of the power diverter 102, the control signals sent by the control system 120 maintain the MEMS switch 110 and the MEMS protection switch 114 in open states. To transition the power diverter 102 from its OFF state to its ON state, the control signals sent by the control system 120 i) close the MEMS switch 110, and then ii) close the MEMS protection switch 114. In this manner, the state of the MEMS switch 110 is switched (from open to closed) under a lower power (or no power) condition. To transition the power diverter 102 from its ON state to its OFF state, the control signals i) open the MEMS protection switch 114, and then ii) open the MEMS switch 110. Again, the state of the MEMS switch 110 is switched (this time, from closed to open) under a lower power (or no power) condition.

By way of example, the signal input 106 may be coupled to a signal source 122, such as a signal generator, or circuitry that amplifies or relays a signal. Also by way of example, the signal output 108 may be coupled to a protected component 124. In some cases, the protected component 124 may comprise one or more MEMS switch (e.g., a single MEMS switch, or an bank of MEMS switches), which MEMS switch(es) may not be safe to switch at high (or full) signal power. In other cases, the protected component may comprise one or more non-MEMS circuit components.

Figure 2:
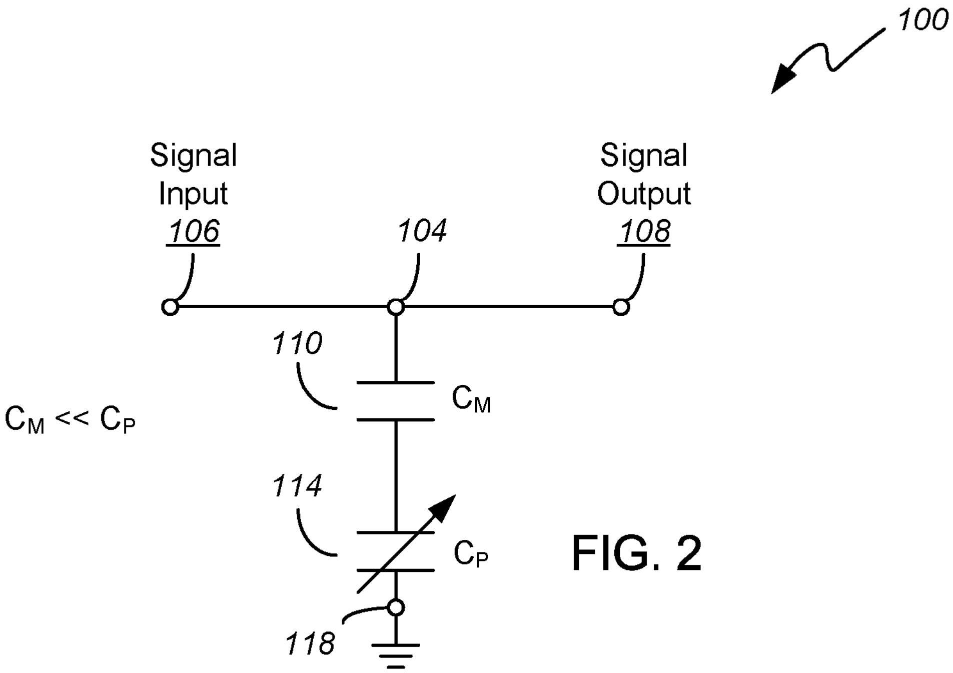
FIG. 2 provides a simplified schematic diagram of the power diverter shown in FIG. 1, in its OFF state.

FIG. 2 provides a simplified schematic diagram 200 of the power diverter 102 in its OFF state. Given current manufacturing processes, and as shown, the "open" capacitance ($C_M$) of the MEMS switch 110 can typically be made much smaller than the "open" capacitance ($C_p$) of the MEMS protection switch 114—especially if the MEMS protection switch 114 is a semiconductor-type switch. When this is done, the insertion loss and bandwidth of the power diverter 102 are primarily established by the smaller capacitance of the MEMS switch 110. In terms of signal distortion, the signal level across the semiconductor switch "open" capacitance is reduced by the voltage divider formed by the capacitances $C_M$ and $C_p$. For example, if the MEMS switch "open" capacitance ($C_M$) is one-tenth ($1/10^{th}$) that of the semiconductor switch "open" capacitance ($C_p$), the voltage at the semiconductor switch is 21 decibels (dB) lower than it would be without the presence of the MEMS switch 110, leading to a corresponding reduction in signal distortion.

FIGS. 3 & 4 illustrate alternate exemplary implementations 300, 400 of the power diverter 102. In each of the exemplary implementations 300, 400, the MEMS protection switch 114 is implemented using a semiconductor switch, such as a field effect transistor (FET) switch (FIG. 3) or a diode switch (FIG. 4).

In the implementation 300 (FIG. 3), the MEMS protection switch 114 is shown to comprise a FET switch 302. The FET switch 302 is connected in series with the MEMS switch 110, between the MEMS switch 110 and the ground terminal 118. The FET switch 302 is coupled between the MEMS switch 110 and the ground terminal 118 via the FET's source and drain terminals, with the FET's gate terminal providing the protection switch control input 116. Preferably, a high value bias resistor, R1, is coupled in parallel with the FET switch 302. In this manner, the current draw of the power diverter 300 is reduced while in its ON state.

In the implementation 400 (FIG. 4), the MEMS protection switch 114 is shown to comprise a diode switch. The diode switch comprised of a pair of oppositely biased diodes 402, 404, each of which is coupled in series with a respective diode bias resistor R2 or R3, with the diode bias resistors being coupled to receive control signals (e.g., voltage biases) from the control system 120. When the oppositely biased diodes 402, 404 are biased symmetrically, a DC voltage of zero may be maintained at the terminal 104, and current leakage can be prevented. By way of example, the diodes of the diode switch may be implemented using PIN diodes, Schottky diodes, modified barrier diodes, or other types of diodes. Capacitors C1 and C2 couple the nodes between the series-connected diodes 402, 404 and resistors R2, R3 to ground.

Figure 5:
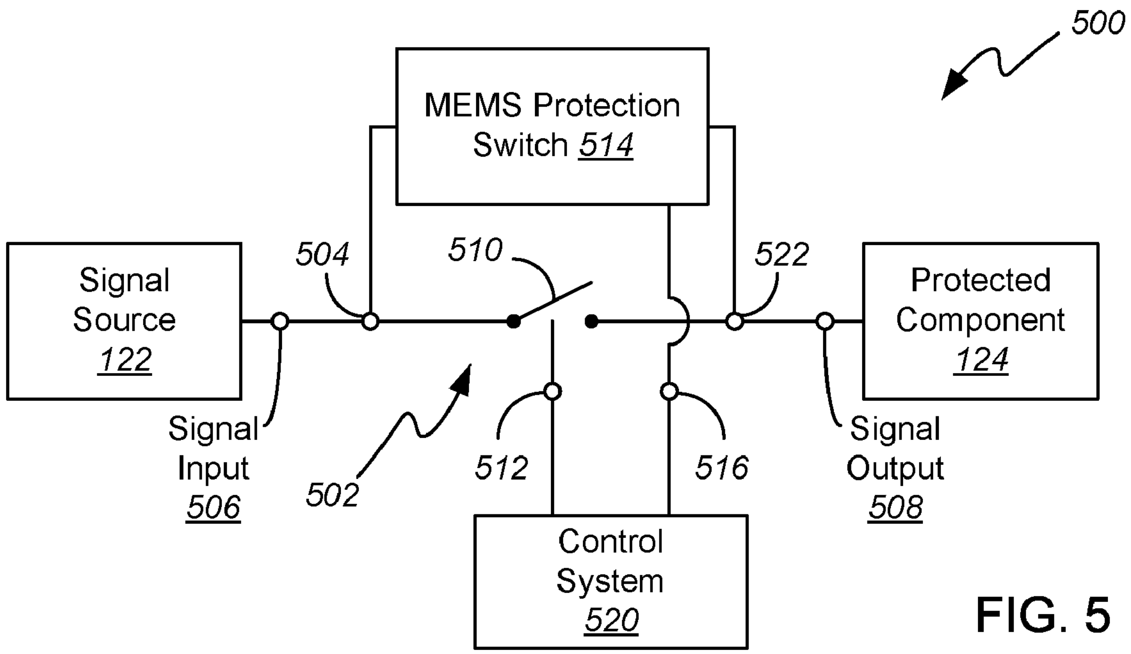
FIG. 5 illustrates a second exemplary apparatus comprising a second exemplary power diverter (a series power diverter)

Having described an exemplary shunt power diverter 102 (FIG. 1), and exemplary implementations 300, 400 thereof (FIGS. 3 & 4), an exemplary series power diverter 502 (FIG. 5) will now be described. In this regard, FIG. 5 illustrates a second exemplary apparatus 500 comprising an exemplary power diverter 502.

In general, the power diverter 502 has a first terminal 504 for interposition between a signal input 506 and a signal output 508. A MEMS switch 510 is coupled to the first terminal and has a MEMS switch control input 512. A MEMS protection switch 514 is coupled to the MEMS switch 510 and has a protection switch control input 516. The MEMS switch control input 512 and the protection switch control input 516 are configured to receive control signals for selectively placing the power diverter 502 in an ON state, an OFF state, and an intermediary state. As will become clear later in this description, the power diverter 102 can be cycled through the intermediary state prior to switching the state of the MEMS switch 510. In this manner, the MEMS switch 510 can be switched under safe conditions, thereby preserving the life of the MEMS switch 510, and consequently, the life of the power diverter 502.

The power diverter 502 is specifically configured as a series power diverter by providing the power diverter 502 with a second terminal 522 for interposition between the signal input 506 and the signal output 508. The MEMS switch 510 and the MEMS protection switch 514 are then coupled in parallel between the first terminal 504 and the second terminal 522, in the signal path between the signal input 506 and the signal output 508.

In the ON state of the power diverter 502, signal power from the signal input 506 is diverted from the signal output 508 via the MEMS switch 510 and the MEMS protection switch 514. In the OFF state, signal power from the signal input 506 is not diverted from the signal output 508, and the MEMS switch 510 mitigates an insertion loss and distortion that is imparted by the MEMS protection switch 514 to a signal path between the signal input 506 and the signal output 508. In the intermediary state, the MEMS protection switch 514 reduces current flow through the MEMS switch 510.

By way of example, a control system 520 may send control signals to the MEMS switch control input 512 and the protection switch control input 516. During the OFF state of the power diverter 502, the control signals maintain the MEMS switch 510 in a closed state and maintain the MEMS protection switch 514 in an open state. To transition the power diverter 502 from its OFF state to its ON state, the control signals i) close the MEMS protection switch 514, then ii) open the MEMS switch 510, and then iii) open the MEMS protection switch 514. In this manner, the state of the MEMS switch 510 is switched (from closed to open) under a lower power condition. To transition the power diverter 502 from its ON state to its OFF state, the control signals i) close the MEMS protection switch 514, then ii) close the MEMS switch 510, and then iii) open the MEMS protection switch 514. Again, the state of the MEMS switch 510 is switched (this time, from open to closed) under a lower power condition.

Figure 6:
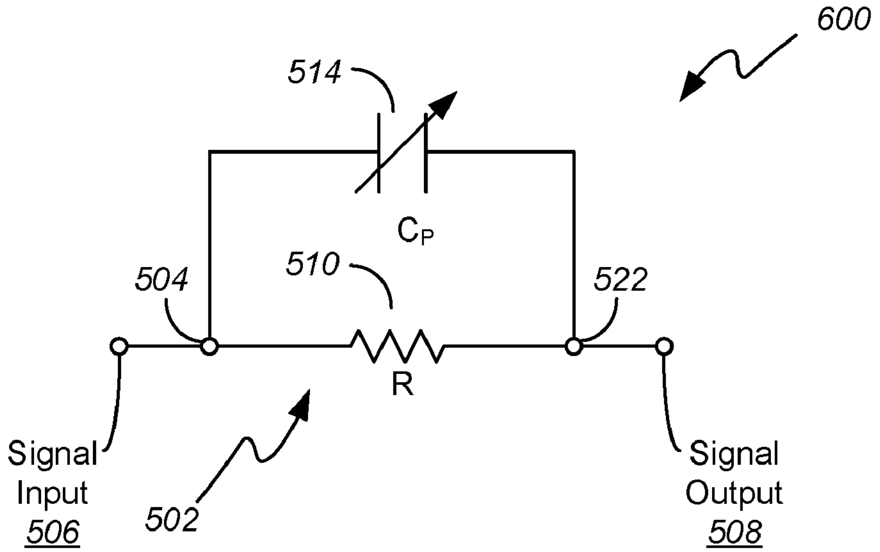
FIG. 6 provides a simplified schematic diagram of the power diverter shown in FIG. 5, in its OFF state.

FIG. 6 provides a simplified schematic diagram 600 of the power diverter 502 in its OFF state. As shown, the MEMS switch 510 adds a "closed" series resistance ($R_{Closed}$) to the signal path between the signal input 506 and the signal output 508. Using current MEMS manufacturing processes, the "closed" resistance of the MEMS switch 510 can be made smaller than the "closed" resistance of a semiconductor switch (as might have been used to divert power from a signal output in the past). The MEMS switch 510 therefore reduces the insertion loss, and improves the bandwidth, of the power diverter 502 (as compared to a power diverter that injects the resistance of a closed semiconductor switch in the signal path during the power diverter's OFF state).

The relatively lower "closed" resistance of the MEMS switch 510 also reduces the voltage across the MEMS protection switch 514, which mitigates the distortion that the MEMS protection switch 514 imparts to the signal path between the signal input 506 and the signal output 508.

Figure 7:
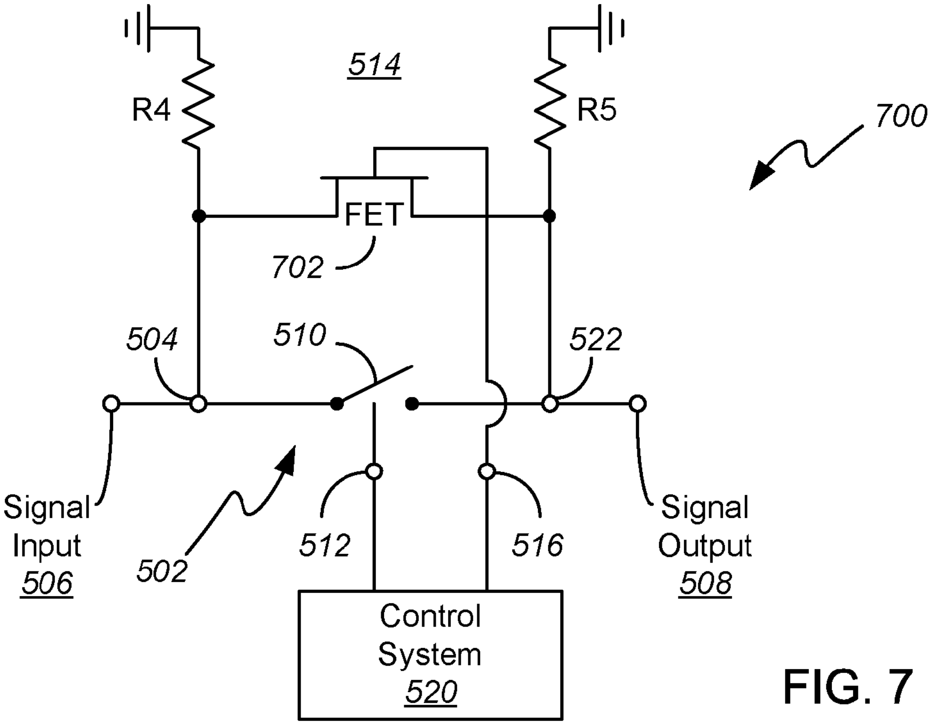
FIG. 7 illustrates a FET implementation of the MEMS protection switch shown in FIG. 5.
Figure 8:
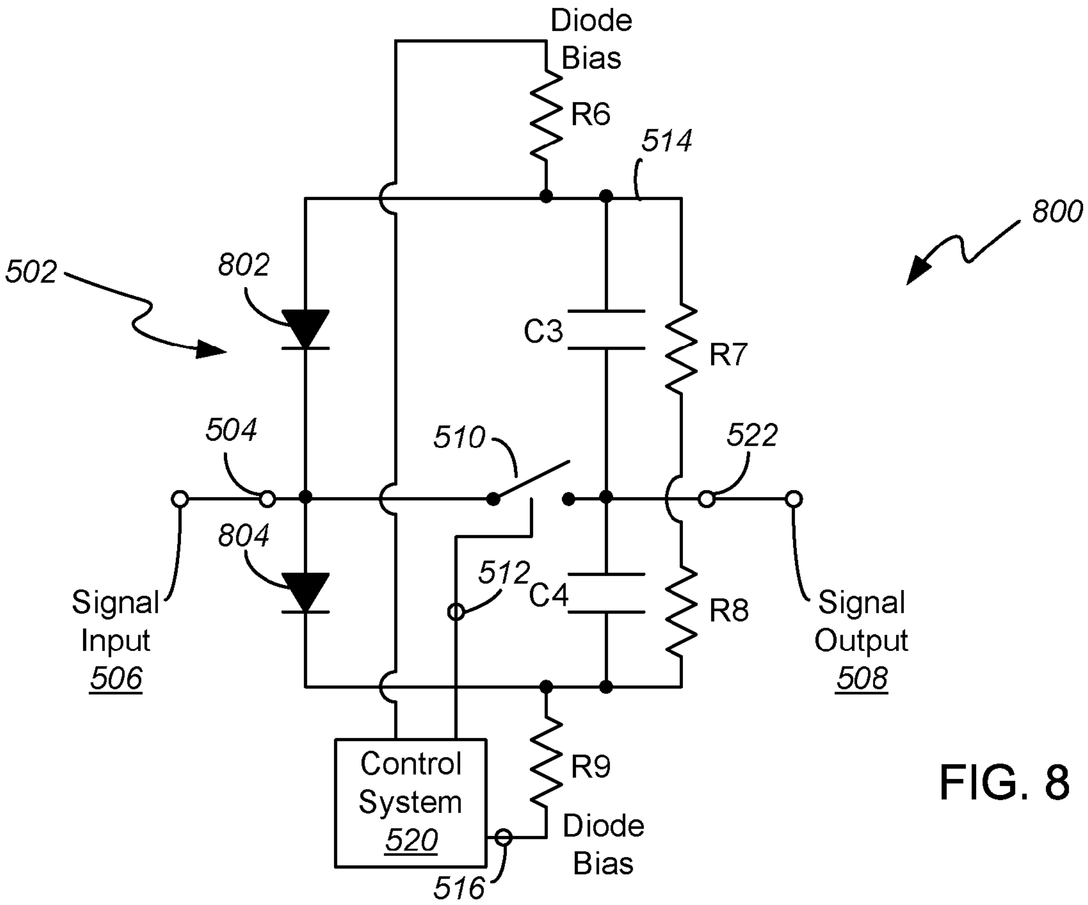
FIG. 8 illustrates a diode implementation of the MEMS protection switch shown in FIG. 5.

FIGS. 7 & 8 illustrate alternate exemplary implementations 700, 800 of the power diverter 502. In each of the exemplary implementations 700, 800, the MEMS protection switch 514 is implemented using a semiconductor switch, such as a field effect transistor (FET) switch (FIG. 7) or a diode switch (FIG. 8).

In the implementation 700 (FIG. 7), the MEMS protection switch 514 is shown to comprise a FET switch 702. The FET switch 702 is connected in parallel with the MEMS switch 510, between the first terminal 504 and the second terminal 522 of the power diverter 502. The FET switch 702 is coupled between the first and second terminals 504, 522 via the FET's source and drain terminals, with the FET's gate terminal providing the protection switch control input 516. Preferably, high value bias resistors, R4 and R5, are coupled between respective ones of the first and second terminals 504, 522 and ground.

In the implementation 800 (FIG. 8), the MEMS protection switch 514 is shown to comprise a diode switch. The diode switch comprises a pair of diodes 802, 804, each of which is coupled across the MEMS switch 510 with capacitors C3 or C4. Resistors R6 and R9 are large value bias resistors, and resistors R7 and R8 improve the transient response of the switch. The diode switch receives control signals (e.g., voltage biases) from the control system 520. The diode switch is placed in its closed state when the control system 520 applies a voltage that forward biases the diodes 802, 804. Because of the capacitive coupling across the MEMS switch 510, the diode switch is closed only for voltage transients. Conversely, the diode switch is placed in its open state when the control system 520 applies a voltage that reverse biases the diodes 802, 804.

Figure 9:
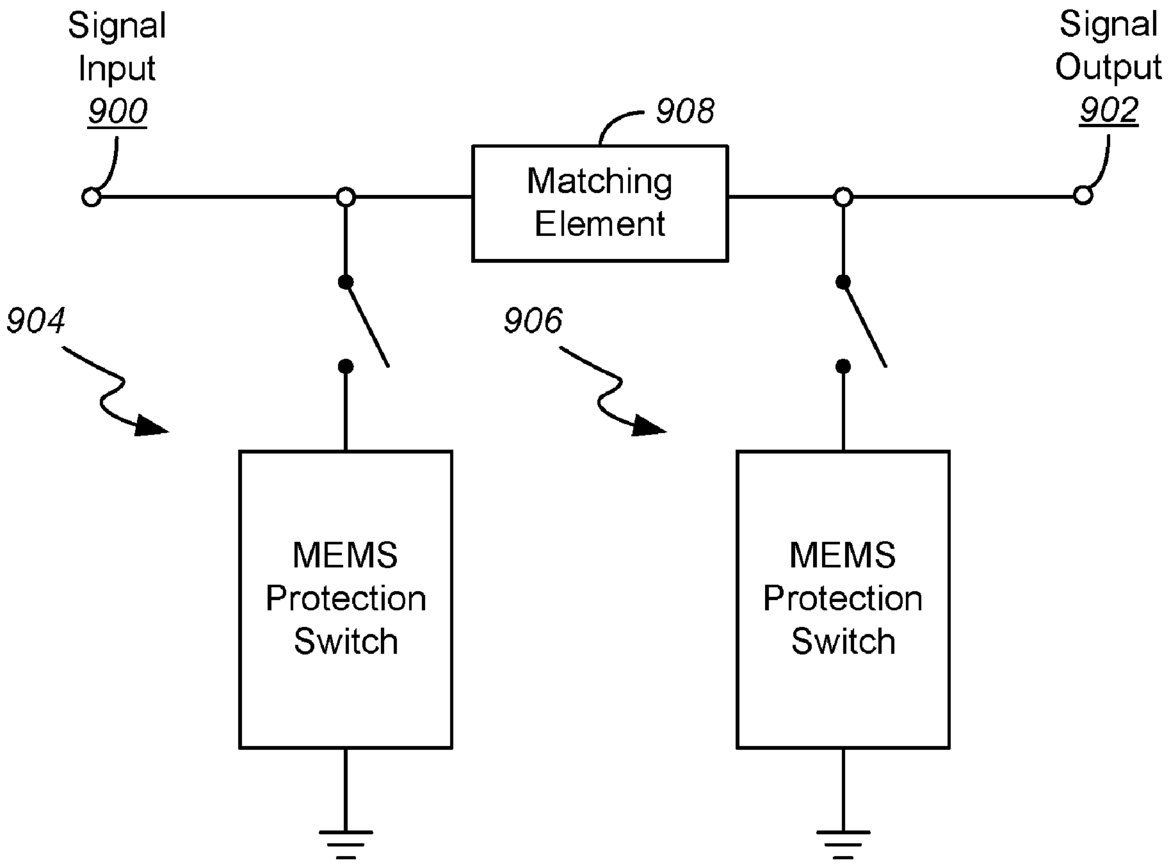
FIG. 9 illustrates the use of two shunt power diverters between a signal input and a signal output.
Figure 10:
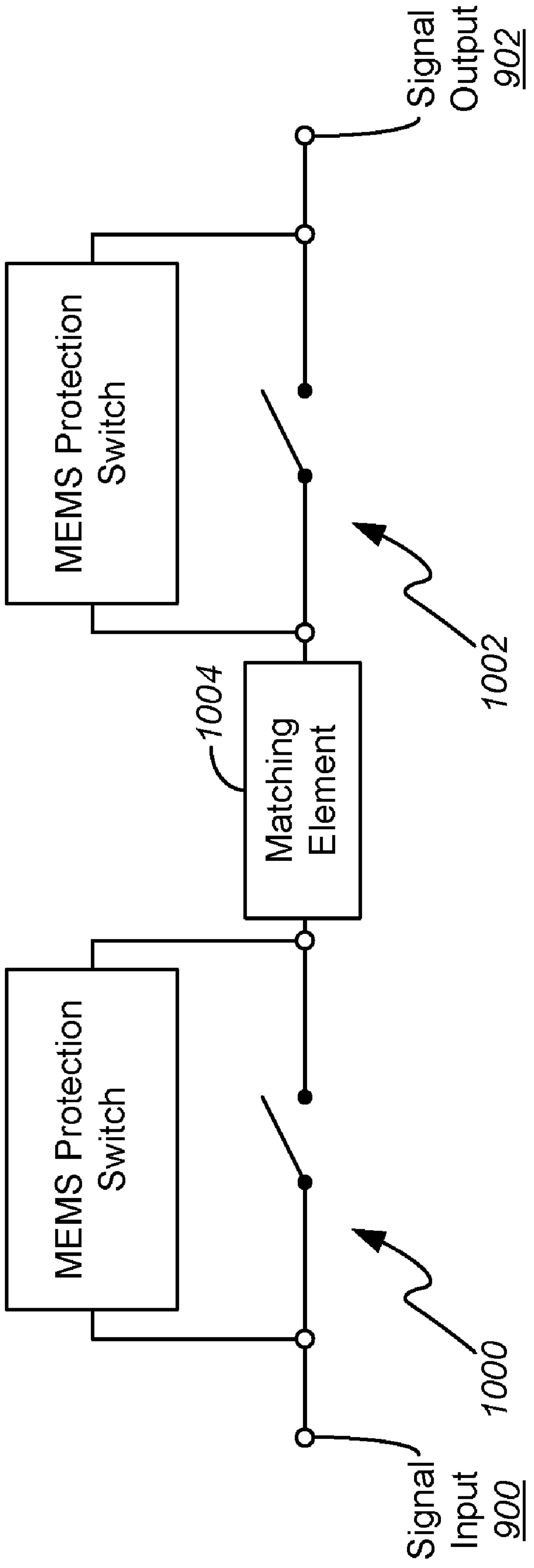
FIG. 10 illustrates the use of two series power diverters between a signal input and a signal output.
Figure 11:
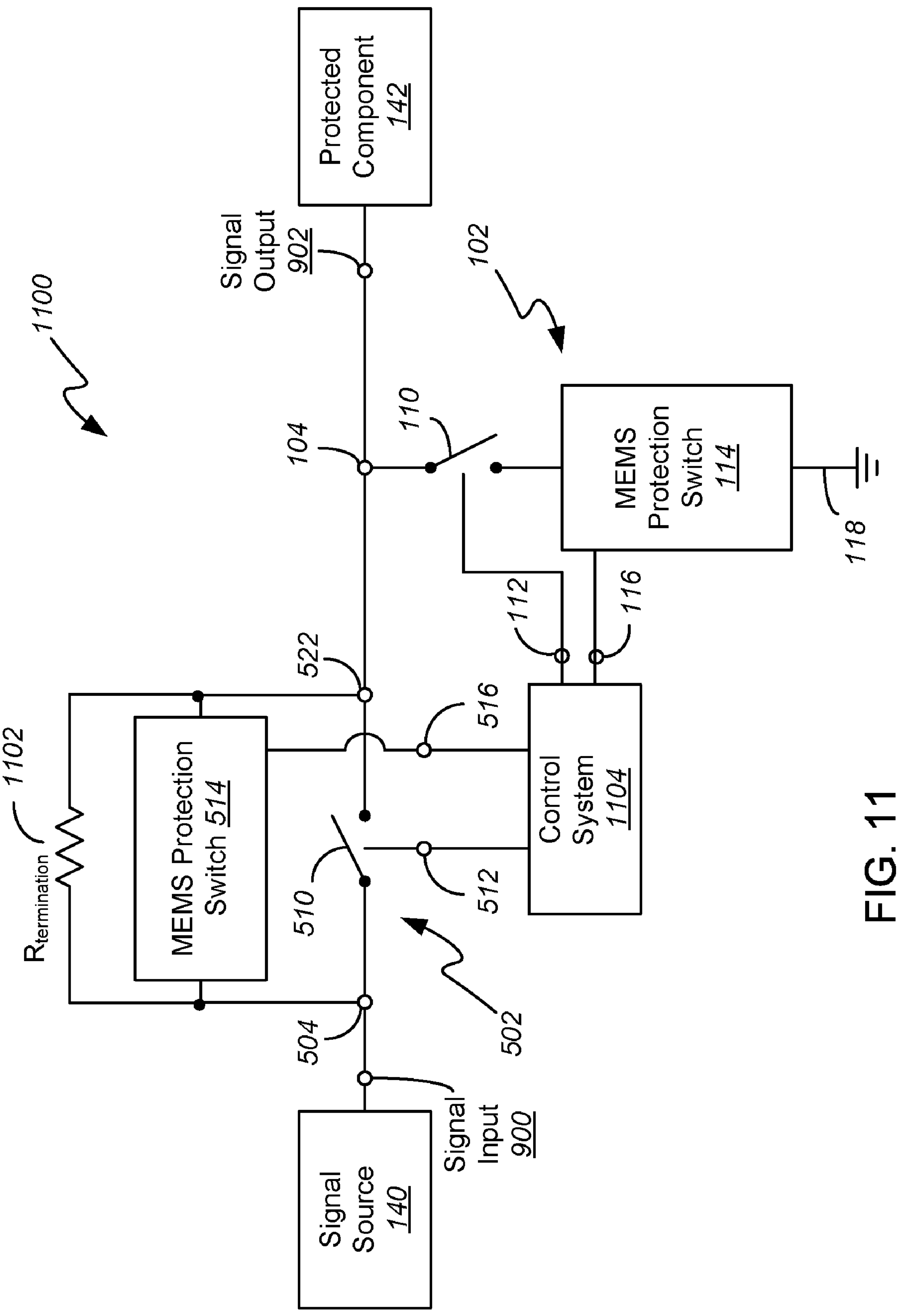
FIG. 11 illustrates the use of shunt and series power diverters between a signal input and a signal output, wherein the series power diverter is associated with a termination resistor.
Figure 12:
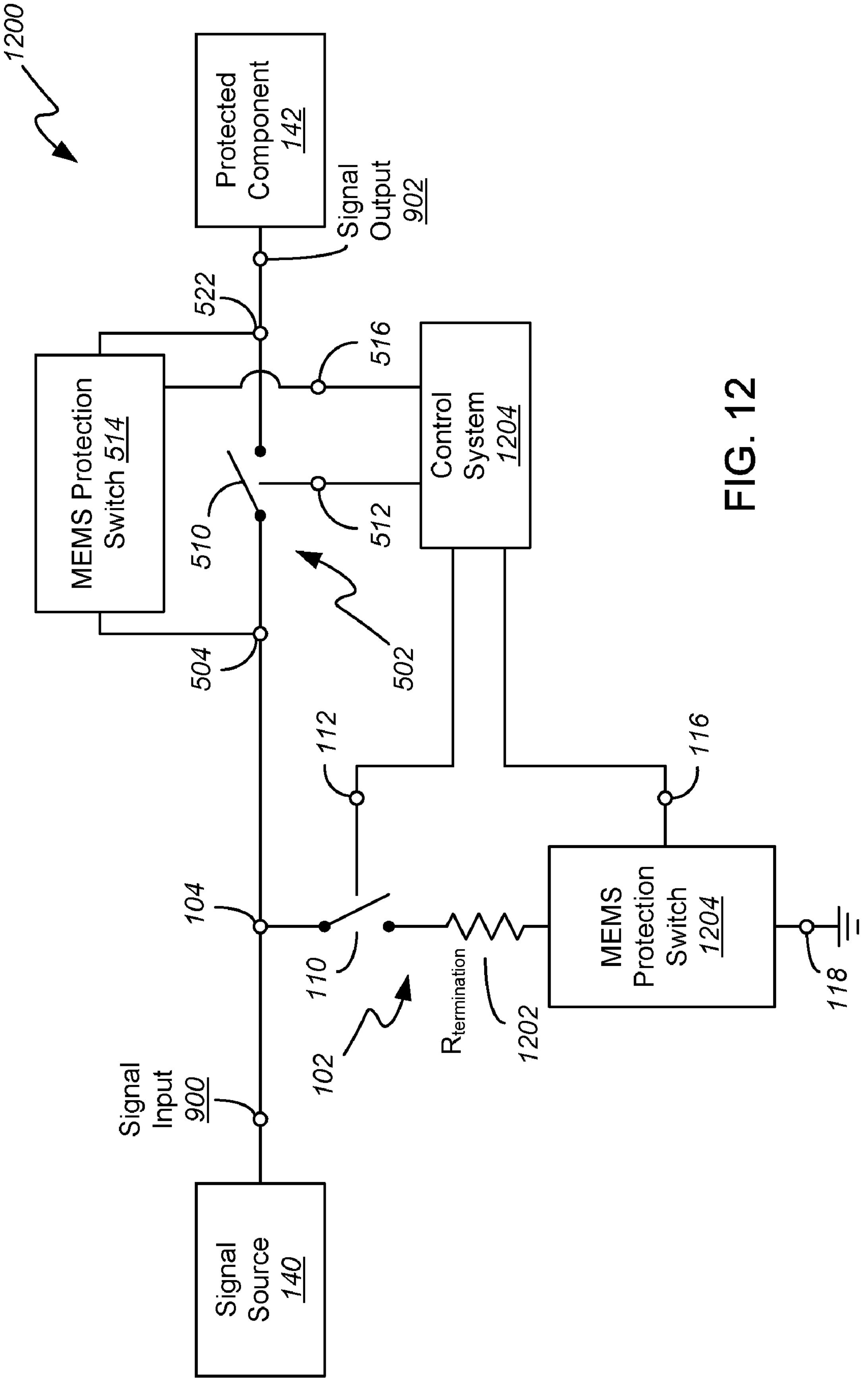
FIG. 12 illustrates the use of shunt and series power diverters between a signal input and a signal output, wherein the shunt power diverter is associated with a termination resistor.

As shown in FIGS. 9-12, a plurality of power diverters of the same or different types may be interposed between a signal input 900 and a signal output 902. By way of example, FIG. 9 illustrates an exemplary use of two shunt power diverters 904, 906, each of which may be configured as shown in any of FIG. 1, 3 or 4 (or in other ways). By way of further example, FIG. 10 illustrates an exemplary use of two series power diverters 1000, 1002, each of which may be configured as shown in any of FIG. 5, 7 or 8 (or in other ways). By way of still further example, FIG. 11 illustrates the use of both shunt and series power diverters 102, 502, wherein the series power diverter 502 (instead of the shunt power diverter 102) is coupled nearer the signal input 900. Similarly, FIG. 12 illustrates the use of both shunt and series power diverters 102, 502, wherein the shunt power diverter 102 (instead of the series power diverter 502) is coupled nearer the signal input 900.

To improve the transmission performance of a signal path, the different power diverters shown in any of FIGS. 9-12 may be coupled to one another via optional "matching elements" 908, 1004, as shown in FIGS. 9 & 10. Of note, the nature of a matching element may take different forms, and will often depend on the configurations of the power diverters that it couples. By way of example, a matching element 908, 1004 may comprise series or shunt inductors or capacitors, or other series or shunt transmission line elements. The use of one or more matching elements can improve system performance by better matching the power diverters to the desired impedance of the signal path between the signal input 900 and the signal output 902.

When a series power diverter 502 (FIG. 5) is in its ON state and is protecting a component 508, it presents an open circuit to an incoming signal. In contrast, when a shunt power diverter 102 (FIG. 1) is in its ON state and is protecting a component 108, it presents a short circuit to an incoming signal. However, some applications require that an incoming signal be resistively terminated at all times. For these applications, a combination of shunt and series power diverters can be used to deploy a termination resistor ($R_{termination}$). For example, and as shown in FIG. 11, an optional termination resistor 1102 may be coupled in parallel with the MEMS switch 510 of the series power diverter 502. Alternately, and as shown in FIG. 12, an optional termination resistor 1202 may be coupled in series with the MEMS protection switch 114 of the shunt power diverter 102, between the MEMS switch 110 of the shunt power diverter 102 and the ground terminal 118.

As shown in FIG. 11, the apparatus 1100 may comprise a control system 1104 that sends control signals to the switch control inputs 112, 116, 512, 516 of the shunt and series power diverters 102, 502. To ensure that the signal path between the signal input 900 and the signal output 902 is always terminated, the control system 1104 may cause signal power at the signal input 900 to be supplied to the signal output 902 by i) first placing the shunt power diverter 502 in its OFF state, and then ii) placing the series power diverter 102 in its OFF state. Similarly, the control system 1104 may cause power at the signal input 900 to be diverted from the signal output 902 by i) first placing the series power diverter 502 in its ON state, and then placing the shunt power diverter 102 in its ON state.

The apparatus 1200 (FIG. 12) may also comprise a control system 1204 that sends control signals to the switch control inputs 112, 116, 512, 516 of the shunt and series power diverters 102, 502. To ensure that the signal path between the signal input 900 and the signal output 902 is always terminated, the control system 1204 may cause signal power at the signal input 900 to be supplied to the signal output 902 by i) first placing the series power diverter 502 in its OFF state, and then ii) placing the shunt power diverter 102 in its OFF state. Similarly, the control system 1104 may cause power at the signal input 900 to be diverted from the signal output 902 by i) first placing the shunt power diverter 102 in its ON state, and then ii) placing the series power diverter 502 in its ON state.

Of note, the power diverters shown in FIGS. 9-12 are sometimes referred to in the claims as first and second power diverters.

What is claimed is:

1. Apparatus, comprising:

a power diverter having, a first terminal for interposition between a signal input and a signal output;

a MEMS switch coupled to the first terminal, the MEMS switch having a MEMS switch control input;

a MEMS protection switch coupled to the MEMS switch, the MEMS protection switch having a protection switch control input;

wherein the MEMS switch control input and the protection switch control input are configured to receive control signals for selectively placing the power diverter in i) an ON state in which signal power at the signal input is diverted from the signal output via the MEMS switch and the MEMS protection switch, ii) an OFF state in which signal power at the signal input is not diverted from the signal output, and in which the MEMS switch mitigates an insertion loss and distortion imparted by the MEMS protection switch to a signal path between the signal input and the signal output, and iii) an intermediary state in which the MEMS protection switch reduces current flow through the MEMS switch; and a control system, the control system configured to send control signals to the MEMS switch control input and the protection switch control input, the control signals:

maintaining the MEMS switch and the MEMS protection switch in open states during the OFF state of the power diverter;

transitioning the power diverter from the OFF state to the ON state by i) closing the MEMS switch, and then ii) closing the MEMS protection switch; and transitioning the power diverter from the ON state to the OFF state by i) opening the MEMS protection switch, then ii) opening the MEMS switch.

2. The apparatus of claim 1, wherein:

the power diverter further has a ground terminal; and the MEMS switch and the MEMS protection switch are coupled in series between the first terminal and the ground terminal, in shunt with the signal path between the signal input and the signal output.

3. The apparatus of claim 1, wherein the MEMS protection switch comprises a semiconductor switch.

4. The apparatus of claim 3, wherein the semiconductor switch comprises a field effect transistor (FET) switch.

5. The apparatus of claim 3, wherein the semiconductor switch comprises a diode switch.

6. The apparatus of claim 1, further comprising a second MEMS switch, coupled to the signal output.

7. The apparatus of claim 1, further comprising a bank of MEMS switches, coupled to the signal output.

8. Apparatus, comprising:

a plurality of power diverters, each of the number of power diverters having, a first terminal for interposition between a signal input and a signal output;

a MEMS switch coupled to the first terminal, the MEMS switch having a MEMS switch control input; and a MEMS protection switch coupled to the MEMS switch, the MEMS protection switch having a protection switch control input;

wherein the MEMS switch control input and the protection switch control input are configured to receive control signals for selectively placing the power diverter in i) an ON state in which signal power at the signal input is diverted from the signal output via the MEMS switch and the MEMS protection switch, ii) an OFF state in which signal power at the signal input is not diverted from the signal output, and in which the MEMS switch mitigates an insertion loss and distortion imparted by the MEMS protection switch to a signal path between the signal input and the signal output, and iii) an intermediary state in which the MEMS protection switch reduces current flow through the MEMS switch, the plurality of power diverters comprises a first power diverter and a second power diverter;

the first power diverter comprises a second terminal;

the MEMS switch of the first power diverter and the protection switch of the first power diverter are coupled in parallel between the first terminal of the first power diverter and the second terminal of the first power diverter, in the signal path between the signal input and the signal output;

the second power diverter has a ground terminal; and the MEMS switch of the second power diverter and the MEMS protection switch. of the second power diverter are coupled in series between the first terminal of the second power diverter and the ground terminal, in shunt with the signal path between the signal input and the signal output.

9. The apparatus of claim 8, further comprising a termination resistor coupled in parallel with the MEMS switch of the first power diverter, wherein the first terminal of the second power diverter is configured for interposition between the first power diverter and the signal output.

10. The apparatus of claim 9, further comprising a control system, the control system sending control signals to the switch control inputs of the first and second power diverters, the control signals:

causing signal power at the signal input to be supplied to the signal output by placing the second power diverter in its OFF state, and then placing the first power diverter in its OFF state; and causing power at the signal input to be diverted from the signal output by placing the first power diverter in its ON state, and then placing the second power diverter in its ON state.

11. The apparatus of claim 8, further comprising a termination resistor coupled in series with the MEMS protection switch of the second power diverter, between the MEMS switch of the second power diverter and the ground terminal, wherein the second power diverter is configured for interposition between the signal input and the first power diverter.

12. The apparatus of claim 11, further comprising a control system, the control system sending control signals to the switch control inputs of the first and second power diverters, the control signals:

causing signal power at the signal input to be supplied to the signal output by placing the first power diverter in its OFF state, and then placing the second power diverter in its OFF state; and causing power at the signal input to be diverted from the signal output by placing the second power diverter in its ON state, and then placing the first power diverter in its ON state.

13. The apparatus of claim 8, further comprising a ground terminal, wherein: the plurality of power diverters comprises a first power diverter and a second power diverter;

the MEMS switch of the first power diverter and the MEMS protection switch of the first power diverter are coupled in series between the first terminal of the first power diverter and the ground terminal, in shunt with the signal path between the signal input and the signal output; and the MEMS switch of the second power diverter and the MEMS protection switch of the second power diverter are coupled in series between the first terminal of the second power diverter and the ground terminal, in shunt with the signal path between the signal input and the signal output.

14. The apparatus of claim 13, further comprising a matching component, coupled between the first terminals of the first power diverter and the second power diverter.

15. The apparatus of claim 8, wherein: the plurality of power diverters comprises a first power diverter and a second power diverter;

the first power diverter comprises a second terminal;

the MEMS switch of the first power diverter and the MEMS protection switch of the first power diverter are coupled in parallel between the first terminal of the first power diverter and the second terminal of the first power diverter, in the signal path between the signal input and the signal output;

the second power diverter comprises a second terminal; and the MEMS switch of the second power diverter and the MEMS protection switch of the second power diverter are coupled in parallel between the first terminal of the second power diverter and the second terminal of the second power diverter, in the signal path between the signal input and the signal output.

16. The apparatus of claim 15, further comprising a matching component, coupled between the second terminal of the first power diverter and the first terminal of the second power diverter.

* * * * *

UNITED STATES PATENT AND TRADEMARK OFFICE

CERTIFICATE OF CORRECTION

PATENT NO. : 8,405,936 B2
APPLICATION NO. : 12/114696
DATED : March 26, 2013
INVENTOR(S) : Eric R. Ehlers et al.

It is certified that error appears in the above-identified patent and that said Letters Patent is hereby corrected as shown below:

In the Claims:

In column 7, line 66, in claim 8, delete “switch. of” and insert -- switch of --, therefor.

Signed and Sealed this
Eighteenth Day of June, 2013

Teresa Stanek Rea
*Acting Director of the United States Patent and Trademark Office*